United States Patent
Pletka et al.

(10) Patent No.: US 10,552,243 B2
(45) Date of Patent: Feb. 4, 2020

(54) CORRUPT LOGICAL BLOCK ADDRESSING RECOVERY SCHEME

(71) Applicant: International Business Machines Corporation, Armonk, NY (US)

(72) Inventors: Roman A. Pletka, Uster (CH);
Timothy J. Fisher, Cypress, TX (US);
Robert E. Galbraith, Rochester, MN (US); Kevin E. Sallese, Fushear, TX (US); Christopher M. Dennett, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 15/782,119

(22) Filed: Oct. 12, 2017

(65) Prior Publication Data
US 2019/0114217 A1    Apr. 18, 2019

(51) Int. Cl.
| | | |
|---|---|---|
| G06F 11/00 | (2006.01) | |
| G06F 11/07 | (2006.01) | |
| G06F 11/10 | (2006.01) | |
| G11B 20/18 | (2006.01) | |

(52) U.S. Cl.
CPC ........ *G06F 11/073* (2013.01); *G06F 11/1016* (2013.01); *G06F 11/1072* (2013.01); *G11B 20/18* (2013.01)

(58) Field of Classification Search
CPC ............. G06F 11/0727; G06F 11/1004; G06F 11/1076; G06F 11/0766; G06F 11/20; G06F 11/3034; G06F 11/1016
See application file for complete search history.

(56) References Cited

U.S. PATENT DOCUMENTS

| | | |
|---|---|---|
| 8,145,941 B2 | 3/2012 | Jacobson |
| 8,307,241 B2 | 11/2012 | Avila |
| 8,327,230 B2 | 12/2012 | Ni |
| 8,607,123 B2 | 12/2013 | Yang |
| 8,930,622 B2 | 1/2015 | Frost |
| 9,424,131 B2 | 8/2016 | Tang |
| 9,569,306 B1 | 2/2017 | Camp |

(Continued)

FOREIGN PATENT DOCUMENTS

EP    2178216 A1    4/2010

OTHER PUBLICATIONS

Worley, Melissa, "Error correction in Flash memory", California State University Stanislaus, Oct. 24, 2010, 15 pages.

*Primary Examiner* — Charles Ehne
(74) *Attorney, Agent, or Firm* — David B. Woycechowsky (57) ABSTRACT

Technology for handling page size mismatches when DPL-CLR is performed at multiple levels of a data storage system (for example, RAID level and flash card level). A "corrective DPL" corrects only a portion of the data that would make up a page at the level at which the data is stored (that is, the "initial DPL level"), and, after that, a partially corrected page of data is formed and stored in data storage, with the partially corrected page: (i) having a page size characteristic of the initial DPL; (ii) including the part of the data corrected by the corrective DPL; and (iii) further including other data. In some embodiments, the other data has a pattern that indicates that it is invalid, erroneous data, such that an error message will be returned if this portion of the data is attempted to be read.

19 Claims, 7 Drawing Sheets

(56) References Cited

U.S. PATENT DOCUMENTS

| | | | |
|---|---|---|---|
| 2004/0153746 A1* | 8/2004 | Talagala | G06F 11/1004 714/6.13 |
| 2009/0313453 A1* | 12/2009 | Stefanus | G06F 11/1441 711/210 |
| 2012/0297272 A1* | 11/2012 | Bakke | G06F 11/1076 714/770 |
| 2013/0007531 A1* | 1/2013 | Jibbe | G06F 11/0727 714/42 |
| 2016/0232057 A1* | 8/2016 | Star | G06F 11/1417 |

* cited by examiner

CORRUPT LOGICAL BLOCK ADDRESSING RECOVERY SCHEME

BACKGROUND

The present invention relates generally to the field of logical block addressing (LB A), and more particularly to recovery from LBA errors.

Logical block addressing (LBA) is used to define respective locations of blocks of data stored on computer storage devices (for example, secondary storage systems such as hard disk drives or solid-state disk drives (SSD)). LBA functionality is typically implemented as a simple linear addressing scheme. In LBA, blocks of data are located by an index value in the form of an integer, with the first block being designated as LBA 0, the second block being designated as LBA 1, and so on. Various LBA standards are characterized by various numbers of bits, such as 22-bit LBA, 28-bit LBA, 32-bit LBA, 48-bit LBA and 64-bit LBA. The number of bits refers to the maximum size of entries of the data structures holding the LBA addresses. The larger the number of bit, the larger the number of logical blocks that can be given unique addresses by the LBA system. Data storage devices (that is, non-volatile storage devices) typically use data protection layers (DPL) to allow for error detection and/or recovery of corrupted data stored in the storage device. To do so, DPLs add redundant data. As the term is used herein "redundant data" refer to any type additional data stored for the purposes of error detection and/or recovery. Depending on the DPL, the actual number of errors may differ from the number of errors that can be detected or corrected and some DPLs may only detect errors but not correct them. Some currently conventional types of DPLs include: parity data, error correction codes, cyclic redundancy check (CRC) data, erasure coding, replication and the like.

Modern all-flash arrays typically use forms of LBA that are implemented with several data protection layers (DPL). Each DPL typically performs error detection and correction to protect against a large variety of media-related failures and system-level failures. The error detection and/or correction techniques at a given DPL may involve the use of redundant data (for example, parity data, mirrored data) and/or striping. Typically, on the lowest DPL of an all-flash array, error correction codes (ECC) are used to detect and correct flash media errors within each codeword in a physical flash page. The next higher DPL uses parity information inside a flashcard (or SSD) to protect against chip, channel, and plane failures. Parity information is also typically used on top of flashcards (or SSDs) to protect against the failure of one or more flashcards in the array. The parity schemes used at the flashcard and array level are typically RAID-like parity schemes, for example, RAID-5/6 or similar (note: RAID is short for Redundant Array of Independent Storage Devices). Storage systems may further implement DPLs that use other data protection algorithms such as replication or erasure coding or combinations thereof. Different DPL layers, with their respective types of redundant data schemes, typically operate independently of each other. Herein, the error correction performed by the DPL is called DPL-CLR (short for data protection layer corrupt LBA recovery).

U.S. Pat. No. 9,569,306 states as follows: "A data storage system includes a controller and a non-volatile memory array having a plurality of blocks each including a plurality of physical pages. The controller maintains a logical-to-physical translation (LPT) data structure that maps logical addresses to physical addresses and implements a first data protection scheme that stripes write data over the plurality of physical blocks. In response to a read request requesting data from a target page stripe, the controller detecting errors in multiple physical pages of the target page stripe. In responsive to detecting errors in multiple physical pages of the target page stripe, the controller scans the LPT data structure to identify a set of logical addresses mapped to the target page stripe and triggers recovery of the target page stripe by a higher level controller that implements a second data protection scheme, wherein triggering recovery includes transmitting the set of logical addresses to the higher level controller."

SUMMARY

According to an aspect of the present invention, there is a computer-implemented method, system and computer program product for performing the following operations (not necessarily in the following order): (i) detecting, by an initial data protection layer, corruption within a first DPL-CLR (data protection layer corrupt logical block addressing recovery) data unit, with the first DPL-CLR data unit being characterized by a first data unit size; (ii) correcting, by a corrective data protection layer, a portion of data of the first DPL-CLR data unit to obtain a second DPL-CLR data unit, with the second DPL-CLR data unit being characterized by a second data unit size; and (iii) applying a data replacement.

DETAILED DESCRIPTION

Some embodiments of the present invention deal with technology for handling page size mismatches when DPL-CLR is performed at multiple levels of a data storage system (for example, RAID level and flash card level). In some embodiments, a "corrective DPL" corrects only a portion of the data that would make up a page at the level at which the data is stored (that is, the "initial DPL level"), so a partially corrected page of data is formed and stored in data storage, with the partially corrected page including: (i) the part of the data corrected by the corrective DPL; and (ii) other data. In some embodiments, the other data has a pattern that indicates that it is invalid, erroneous data, such that an error message will be returned if this portion of the data is attempted to be read. This Detailed Description section is divided into the following sub-sections: (i) The Hardware and Software Environment; (ii) Example Embodiment And Discussion; and (iii) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), other non-volatile memory technologies such as phase change memory devices (PCM), resistive random-access memory (RRAM), or magneto-resistive random access memory (MRAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), application-specific integrated circuits (ASIC), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIGS. 1 to 4, data processing environment 100 includes processor systems 102 and data storage system 120. Some embodiments of the present invention (as discussed in more detail in the next sub-section of this Detailed Description section) may be applied to systems like system 100.

Figure 1:
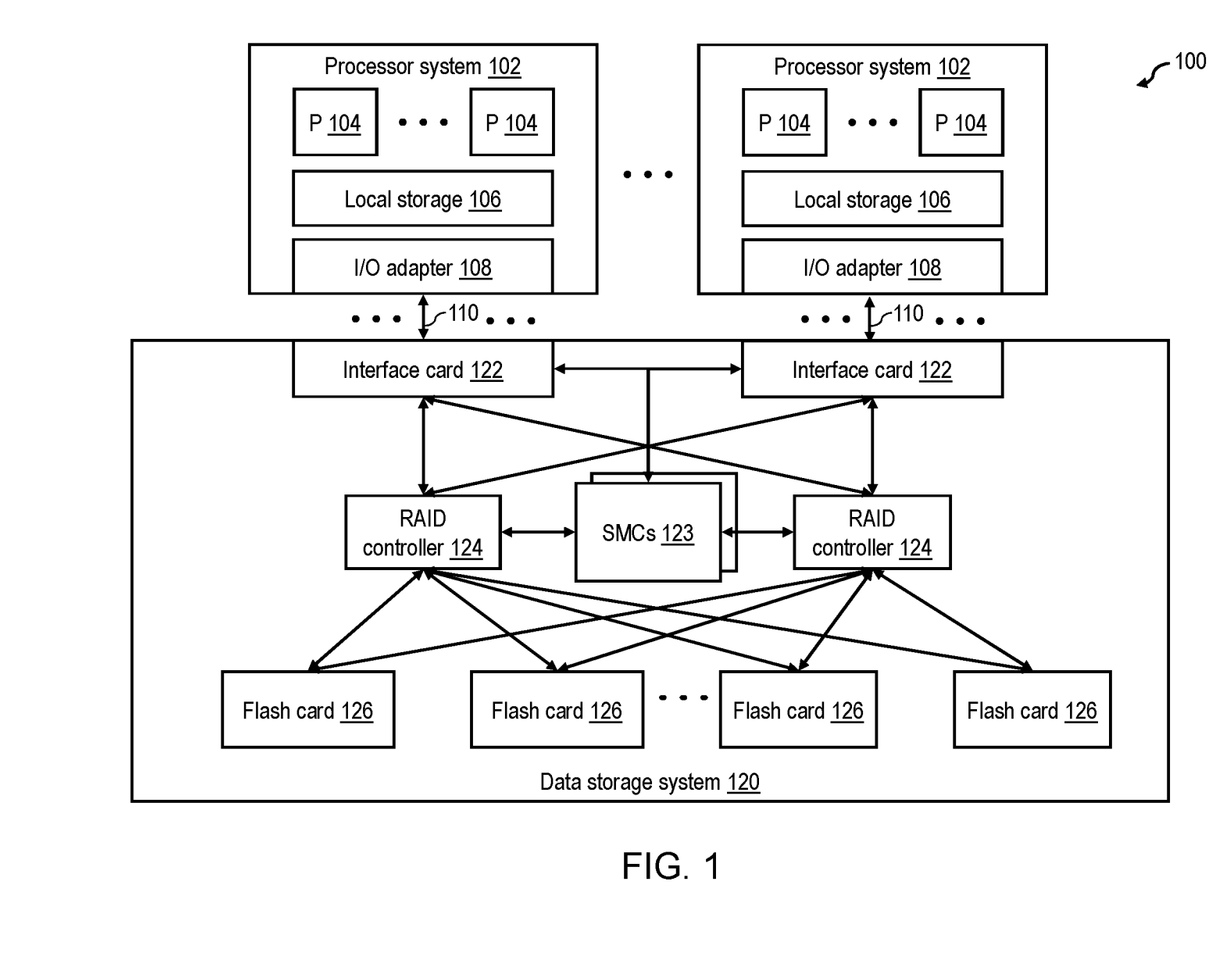
FIG. 1 is a block diagram view of an embodiment of a data processing environment (DPE)—some embodiments of the present invention may be applied within this first embodiment DPE.

As shown in FIG. 1, data storage system 120 includes a non-volatile memory array as described further herein. As shown, data processing environment 100 includes one or more hosts, such as a processor system 102 having one or more processors 104 that process instructions and data. A processor system 102 may additionally include local storage 106 (for example, dynamic random access memory (DRAM) or disks) that may store program code, operands and/or execution results of the processing performed by processor(s) 104. In various embodiments, a processor system 102 can be, for example, a mobile computing device (such as a smartphone or tablet), a laptop or desktop personal computer system, a server computer system (such as one of the POWER series of servers available from International Business Machines Corporation), or a mainframe computer system. A processor system 102 can also be an embedded processor system using various processors such as ARM, PowerPC, Intel X86, or any other processor combined with memory caches, memory controllers, local storage, I/O bus hubs, etc. (Note: the term "PowerPC" may be subject to trademark rights in various jurisdictions throughout the world and is used here only in reference to the products or services properly denominated by the marks to the extent that such trademark rights may exist.) In some embodiments, data storage system 120 may be integrated with one or more processor systems 102.

Each processor system 102 further includes an input/output (I/O) adapter 108 that is coupled directly (that is, without any intervening device) or indirectly (that is, through at least one intermediate device) to a data storage system 120 via an I/O channel 110. In some embodiments, data storage system 120 may be integral to a processor system 102. In various embodiments, I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), NVMe, NVMe-oF, etc. (Note: the term "Express" may be subject to trademark rights in various jurisdictions throughout the world and is used here only in reference to the products or services properly denominated by the marks to the extent that such trademark rights may exist.) I/O operations communicated via I/O channel 110 include read requests by which a processor system 102 requests data from data storage system 120 and write requests by which a processor system 102 requests storage of data in data storage system 120.

In the data processing environment of FIGS. 1 to 4, data storage system 120 includes multiple interface cards 122 through which data storage system 120 receives and responds to input/output operations (request) of hosts via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (for example, by a PCIe bus) to non-volatile storage media, which in the illustrated example include multiple non-volatile memory cards such as flash cards 126 bearing NAND flash memory. In other embodiments, alternative and/or additional non-volatile storage devices can be employed.

In the depicted embodiment, the operation of data storage system 120 is managed by redundant system management controllers (SMCs) 123, which are coupled to interface cards 122 and RAID controllers 124. In various embodiments, system management controller 123 can be implemented utilizing hardware or hardware executing firmware and/or software.

Figure 2:
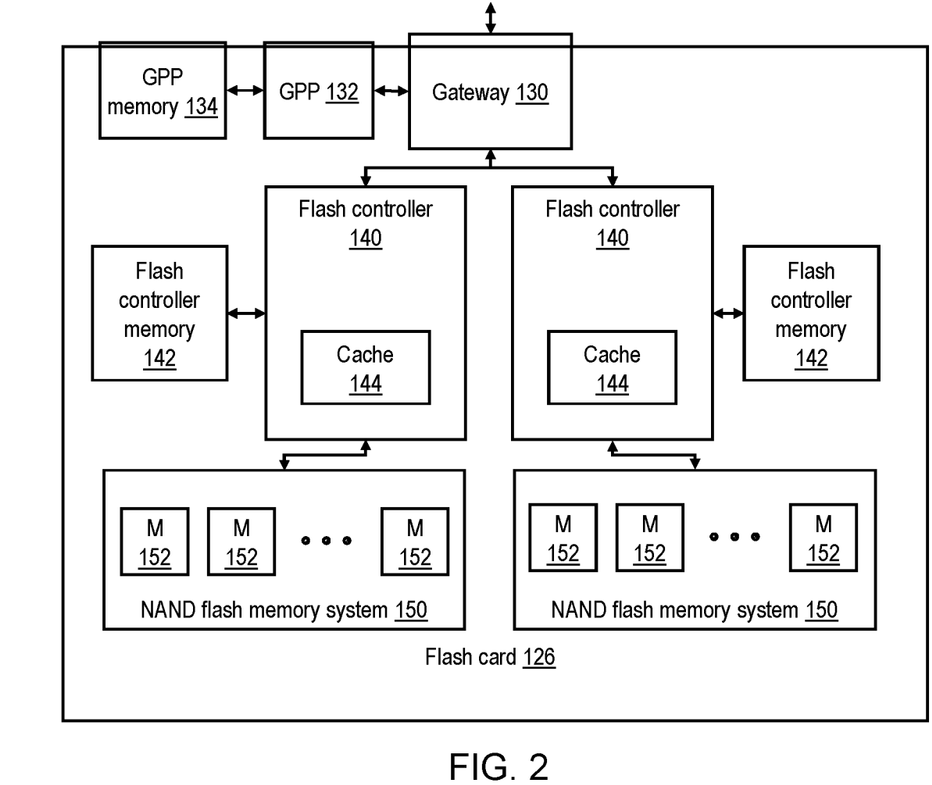
FIG. 2 is a more detailed block diagram view of an exemplary flash card consisting of a portion of the first embodiment DPE.

FIG. 2 depicts a more detailed block diagram of an exemplary embodiment of a flash card 126 of data storage system 120 of FIG. 1. Flash card 126 includes a gateway 130 that serves as an interface between flash card 126 and RAID controllers 124. Gateway 130 is coupled to a general-purpose processor (GPP) 132, which can be configured (for example, by program code) to perform various management functions, such as pre-processing on requests received by gateway 130 and/or to schedule servicing of the requests by flash card 126. GPP 132 is coupled to a GPP memory 134 (for example, Dynamic Random Access Memory (DRAM)) that can conveniently buffer data created, referenced and/or modified by GPP 132 in the course of its processing or data flowing through the gateway 130 destined for one or more of the flash controllers 140.

Gateway 130 is further coupled to multiple flash controllers 140, each of which controls a respective NAND flash memory system 150. Flash controllers 140 can be implemented, for example, by an Application Specific Integrated Circuit (ASIC) and/or a Field Programmable Gate Array (FPGA) and/or a microprocessor, and each have an associated flash controller memory 142 (for example, DRAM). Flash controllers 140 may perform address translation and/or store mappings between logical and physical addresses in a logical-to-physical translation data structure, such as a logical-to-physical translation table (LPT), which may conveniently be stored in flash controller memory 142. Data stored at a typical logical block address LBA may be of 4 KiB which is mapped by the LPT to a physical page location, but other sizes (e.g., 8 KiB or more) may be used as well. When the physical page size is larger than the logical page size, the mapping is typically stored in the LPT as a physical page address and offset. This also means that multiple logical pages may be stored in one physical page. Also, logical and physical pages may not be aligned such that logical pages may straddle into other physical pages. In embodiments in which flash controllers 140 are implemented with an FPGA, GPP 132 may program and configure flash controllers 140 during start-up of data storage system 120. After startup, in general operation flash controllers 140 receive read and write requests from gateway 130 that request to read data stored in NAND flash memory system 150 and/or to store data in NAND flash memory system 150. Flash controllers 140 service these requests, for example, by accessing NAND flash memory systems 150 to read or write the requested data from or into NAND flash memory systems 150 and/or by accessing their respective memory caches 144 (for example, DRAM), which, in some embodiments, can from a part of flash controller memory 142 or flash controller 140. In a preferred embodiment, each flash controller 140 implements a cache management policy that retains in cache 144 pages that have been recently programmed into NAND flash memory system 150 until at least a predetermined delay time has elapsed since the pages were programmed. Further, in at least some embodiments, the cache management policy additionally retains, in cache 144, each lower page programmed in NAND flash memory system 150 at least until the corresponding upper page has satisfied its delay time in NAND flash memory system 150.

Flash controllers 140 implement a flash translation layer (FTL) that provides logical-to-physical address translation to enable access to specific memory locations within NAND flash memory systems 150. In general, a request received by flash controller 140 from a host device, such as a processor system 102, contains the logical block address (LBA) at which the data is to be accessed (read or written) and, if a write request, the write data to be stored to data storage system 120. Note that the LBA may be translated from a host LBA to a flash card LBA by the RAID controller 124 due to addition of parity information. The request may also specify the amount (or size) of the data to be accessed. Other information may also be communicated depending on the protocol and features supported by data storage system 120. The flash translation layer translates LBAs received from a RAID controller 124 into physical addresses assigned to corresponding physical location in NAND flash memory systems 150 and may be performed by flash controller 140.

NAND flash memory systems 150 may take many forms in various embodiments. In the embodiment shown in FIG. 2, each NAND flash memory system 150 includes multiple (for example, 32) individually addressable NAND flash memory storage devices 152. In the illustrated example, the flash memory storage devices 152 take the form of board-mounted flash memory modules, for example, Multi-Level Cell (MLC), Three Level Cell (TLC), or Quad Level Cell (QLC) NAND flash memory modules or a combination thereof. The effective storage capacity provided by flash memory storage devices 152 can be increased through the implementation of data compression, for example, by flash controllers 140 and/or high level controllers, such as GPPs 132, RAID controllers 124 or SMCs 123.

Figure 3:
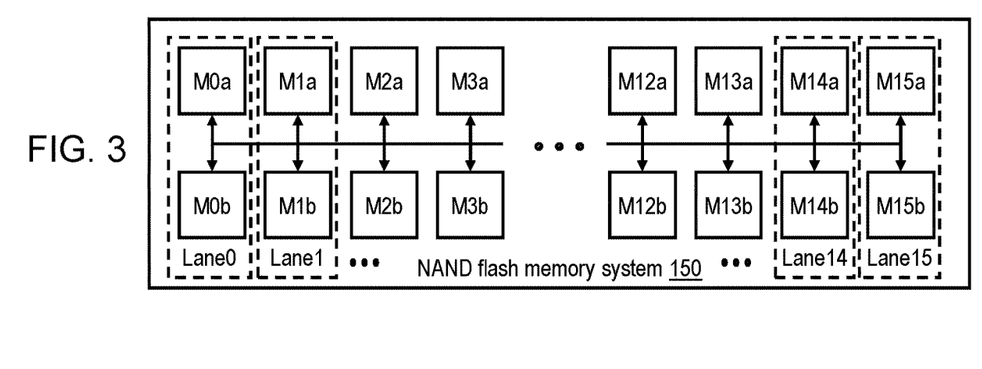
FIG. 3 is a more detailed block diagram view of an exemplary NAND flash memory system corresponding to another portion of the first embodiment DPE.
Figure 4:
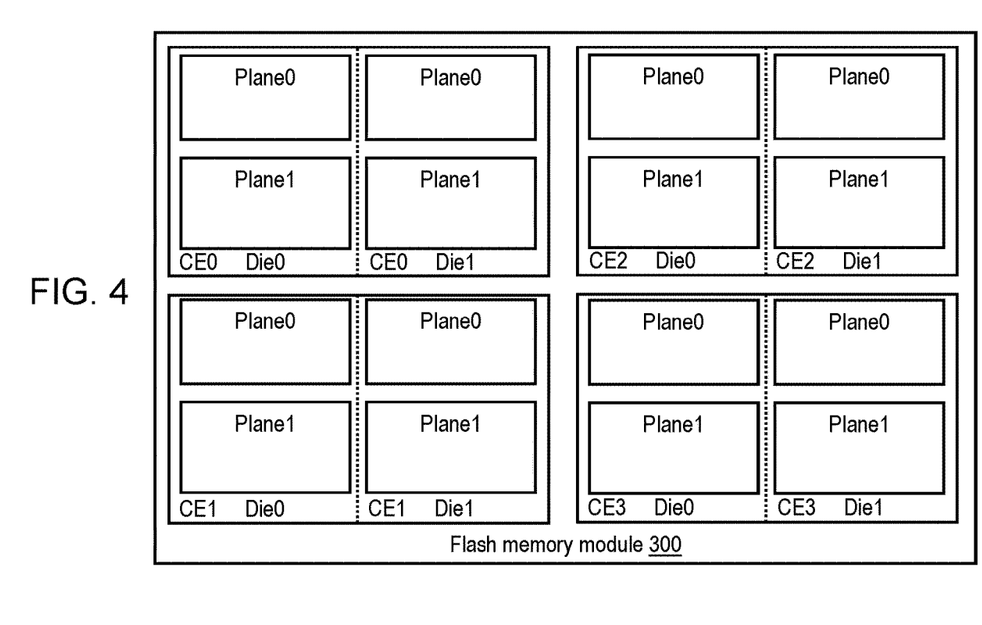
FIG. 4 is block diagram of a portion of the first embodiment DPE.

FIGS. 3 and 4 will now be discussed. NAND flash memory systems 150 may take many forms in various embodiments. Referring now to FIGS. 3 and 4, there is depicted one exemplary arrangement of physical memory within a NAND flash memory system 150.

As shown in FIG. 3, NAND flash memory system 150 may be formed from thirty-two (32) individually addressable NAND flash memory storage devices. In the illustrated example, each of the flash memory storage devices M0*a*-M15*b* takes the form of a board-mounted flash memory module capable of storing one or more bits per cell. Thus, flash memory modules may be implemented with Single Level Cell (SLC), Multi-Level Cell (MLC), Three Level Cell (TLC), or Quad Level Cell (QLC) memory. (Note: the term "SLC" may be subject to trademark rights in various jurisdictions throughout the world and is used here only in reference to the products or services properly denominated by the marks to the extent that such trademark rights may exist.) The thirty-two NAND flash memory modules are arranged in sixteen groups of two, (M0*a*, M0*b*) through (M15*a*, M15*b*). For purposes of the physical addressing scheme, each group of two modules forms a "lane," also sometimes referred to as a "channel," such that NAND flash memory system 150 includes sixteen channels or lanes (Lane0-Lane15).

In data processing environment 100, each of the individual lanes has a respective associated bus coupling it to the associated flash controller 140 (see FIG. 2). Thus, by directing its communications to one of the specific communication buses, flash controller 140 can direct its communications to one of the lanes of memory modules. Because each communication bus for a given lane is independent of the communication buses for the other lanes, a flash controller 140 can issue commands and send or receive data across the various communication buses at the same time, enabling the flash controller 140 to access the flash memory modules corresponding to the individual lanes at, or very nearly at, the same time.

With reference now to FIG. 4, there is illustrated an exemplary embodiment of a flash memory module 300 that can be utilized to implement any of flash memory modules M0*a*-M 15*b* of FIG. 3. As shown in FIG. 4, the physical storage locations provided by flash memory module 300, sometimes also denoted as flash memory chips, are further subdivided into physical locations that can be addressed and/or identified through Chip Enables (CEs). In data processing environment 100, the physical memory of each flash memory module 300 is divided into four Chip Enables (CE0, CE1, CE2 and CE3), each having a respective CE line that is asserted by flash controller 140 to enable access to or from the physical memory locations within the corresponding CE. Each CE is in turn subdivided into multiple dice (for example, Die0 and Die1) each having two or more planes (for example, Plane0 and Plane1). Each plane represents a collection of blocks (described below) that, because of the physical layout of the flash memory chips, are physically associated with one another and that utilize common circuitry (for example, I/O buffers) for the performance of various operations, such as read and write operations.

A plane can be utilized to implement any of the planes within flash memory module 300 of FIG. 4. Such a plane may include, for example, 1024 or 2048 blocks of physical memory. Note that manufacturers often add some additional blocks as some blocks might fail early. In general, a block is a collection of physical pages that are associated with one another, typically in a physical manner. This association is such that a block is defined to be the smallest granularity of physical storage locations that can be erased within NAND flash memory system 150. Each block may include, for example, 256 or 512 or more physical pages, where a physical page is defined to be the smallest individually addressable data unit for read and write access. In the exemplary system, each physical page of data has a common capacity (for example, 16 kB) for data storage plus additional storage for metadata. Thus, data is written into or read from NAND flash memory system 150 on a page-by-page basis, but erased on a block-by-block basis.

If NAND flash memory system 150 is implemented in a memory technology supporting multiple bits per cell, it is common for multiple physical pages of each block to be implemented in the same set of memory cells. For example, assuming 512 physical pages per block and two bits per memory cell (that is, NAND flash memory 150 is implemented in MLC memory), Page0 through Page255 (the lower pages) can be implemented utilizing the first bit of a given set of memory cells and Page256 through Page511 (the upper pages) can be implemented utilizing the second bit of the given set of memory cells. The actual order of lower and upper pages may be interleaved and depends on the manufacturer.

In data processing environment 100, each block includes block status information (BSI), which indicates the page retirement status of physical pages included in that block as retired (that is, no longer used to store user data) or non-retired (that is, active or still usable to store user data). In various implementations, the BSI can be collected into a single data structure (for example, a vector or table) within a block and/or maintained elsewhere in data storage system 120.

Because the flash translation layer implemented by data storage system 120 isolates the logical address space made available to host devices from the physical memory within NAND flash memory system 150, the size of NAND flash memory system 150 need not be equal to the size of the logical address space presented to host devices. In most embodiments, it is beneficial to present a logical address space that is less than the total available physical memory (that is, to over-provision NAND flash memory system 150). Overprovisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space, even given the presence of memory failures and the memory overhead entailed by the use of data protection schemes, such as Error Correcting Code (ECC), Cycle Redundancy Check (CRC), and parity.

In some embodiments, data is written to NAND flash memory system 150 one page at a time. In other embodiments in which more robust error recovery is desired, data is written to groups of associated physical pages of NAND flash memory system 150 referred to herein as "page stripes." In a preferred embodiment, all pages of a page stripe are associated with different lanes to achieve high write bandwidth. Because in many implementations the smallest erase unit is a block, page stripes can be grouped into a block stripe, where each block in the block stripe is associated with a different lane. When a block stripe is built, any free block of a lane can be chosen, but preferably all blocks within the same block stripe have the same or similar health grade. Note that the block selection can be further restricted to be from the same plane, die, and/or chip enable. The lengths of the block stripes can and preferably do vary, but in one embodiment in which NAND flash memory system 150 includes 16 lanes, each block stripe includes between two and sixteen blocks, with each block coming from a different lane. Further details regarding the construction of block stripes of varying lengths are known in the art.

Once a block from each lane has been selected and a block stripe is formed, page stripes are preferably formed from physical pages with the same page number (that is, physical page index) from blocks in the block stripe. While the lengths of the various page stripes stored into NAND flash memory system 150 can and preferably do vary, in one embodiment each page stripe includes one to fifteen data pages of write data (typically provided by a host device) and one additional page (a "data protection page") used to store data protection information for the write data. For example, an exemplary page stripe includes N data pages and one data protection page. The data protection page can be placed on any lane of the page stripe containing a non-retired page, but typically is on the same lane for all page stripes of the same block stripe to minimize metadata information. The addition of a data protection page as illustrated requires that garbage collection be performed for all page stripes of the same block stripe at the same time. After garbage collection of the block stripe completes, the block stripe can be dissolved, and each block can be placed into the relevant ready-to-use (RTU) queue.

In data processing environment 100, a codeword is stored in each data page within page stripe. Typically, a positive integer number of codewords, for example, 2 or 3, are stored in each data page, but an alternative embodiment may also store a single codeword in a data page. For example, each codeword may include a data field, as well as additional fields for metadata describing the data page. Depending on the size of the codeword, the data field holds data for one or more logical pages. In another embodiment, it may also hold fractions of data of logical data pages. In the illustrated example, metadata fields include an LBA field containing the LBAs stored in codeword, a CRC field containing the CRC value computed for the combination of data field and LBA field, and an ECC field containing an ECC value calculated, in the illustrated example, from a combination of contents of the data field, the LBA field, information related to a data replacement strategy, and the CRC field. In embodiments where the data field holds fractions of logical data pages, the LBA field further holds information on which fractions of logical data pages are stored in the data field.

In data processing environment 100, a codeword is included in the data protection page of page stripe. In environment 100, each data protection page stores a positive integer number of codewords, but, alternatively, a data protection page may store a single codeword. For example, a data protection codeword may include a data XOR field that contains the bit-by-bit Exclusive OR (XOR) of the contents of the data fields of the codewords in the page stripe. Data protection codeword further includes an LBA XOR field 804 that contains the bit-by-bit XOR of the LBA fields of the codewords in the page stripe. Data protection codeword finally includes a CRC field and ECC field for respectively storing a CRC value and an ECC value for data protection codeword. Such a protection scheme is commonly referred to as RAID 5, because the parity field will not always be located on one particular flash plane. However, it should be appreciated that alternate data protection schemes such as Reed-Solomon can alternatively or additionally be used.

The formats for data pages and data protection pages described above protect data stored in a page stripe using multiple different data protection mechanisms. First, the use of the ECC bits in each codeword of a data page allows the correction of some number of bit errors within the codeword in a flash page. Depending on the ECC method used it may be possible correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the data protection page for the page stripe.

While the physical memory locations in which the data pages and data protection page of a page stripe will vary within NAND flash memory system 150, in one embodiment the data pages and data protection page that comprise a given page stripe are preferably stored in physical memory locations selected to optimize the overall operation of the data storage system 120. For example, in some embodiments, the data pages and data protection page comprising a page stripe are stored such that different physical lanes are employed to store each of the data pages and data protection page. Such embodiments support efficient access to a page stripe because flash controller 140 can access all of the pages of data that comprise the page stripe simultaneously or nearly simultaneously. It should be noted that the assignment of pages to lanes need not be sequential (that is, data pages can be stored in any lane in any order), and unless a page stripe is a full length page stripe (for example, containing fifteen data pages and one data protection page), the lanes utilized to store the page stripe need not be adjacent.

Some embodiments of the present invention, when applied to DPE 100, includes two components (as will be discussed in further detail in the following sub-section of this Detailed Description section). One running in the corrective DPL, and the other one in the initial DPL. The program in the corrective DPL runs in RAID controller 124 (see FIG. 1) and the program in the initial DPL on Flashcard 126, more specifically, GPP 132, or alternatively, Flash controller 140.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment and Discussion

Some embodiments of the present invention may include one, or more, of the following features, operations, characteristics and/or advantages: (i) the DPLs interact with each other such that they cooperate in the event of one DPL not being able to correct an encountered error; (ii) if an initial DPL is not able to correct an encountered error to recover "uncorrectable data" (that is data that is not able to be corrected by the initial DPL that first detects the error), that DPL communicates data with another DPL to perform error correction in the hope that the other DPL is able to recover the uncorrectable data; and/or (iii) even a partial error correction will sometimes be helpful because the initial DPL may, with the additional information in the form of the partially corrected data or indication of the location of the corrupted data, be able to complete a full recovery of the corrupted data. In the context of data storage devices including flash array storage, this cooperative error recovery is not straight forward due to reasons that will be discussed in the following paragraphs.

One potentially complicating factor is mismatch of page sizes within one DPL (for example, physical and logical page sizes inside flashcards). This potentially complicating factor is not dealt with in this document, but there are known methods for dealing with this issue.

Another potentially complicating factor is mismatch of "page sizes" between DPLs. It is noted that "page sizes" is in tone quotes here because the operative data unit for various DPLs may have different names in the art. For example, while "page size" is the operative unit of memory/storage for a flash card level DPL, "sector size" is the operative unit of memory/storage for a RAID level DPL. Herein, the concept that there is a data unit associated with a given DPL will be more generically referred to, when appropriate, as the corrupt LBA recovery (CLR) data-unit of the DPL (or "CLR-DPL unit"). DPLs may not operate at the same data granularity, meaning that DPLs use different CLR-DPL units.

For instance, in some data storage systems, VRAID (virtual redundant array of independent devices) performs CLR-DPL on 528 Byte sectors (that is, a 528 byte CLR-DPL unit size), whereas a conventional flash card stores logical pages at 4 kilobytes (that is, an approximately 4,000 byte CLR-DPL unit size) or 4224 Bytes. In this example, the flash card level CLR-DPL unit size is approximately eight times as large as the CLR-DPL unit size of the higher level RAID DPL). This results in read-modify-write (RMW) operations in the flash card when VRAID performs CLR as a result of the VRAID level DPL rewriting CLR-DPL units (or, more specifically, sectors) having 528 bytes of recovered data. The read of read-modify-write operation (RMW-R) in the flash card would likely fail when the data is sent back down to the flash card level by the corrective DPL because the original physical page is still uncorrectable when read by the controller in the flash card. In particular, this read operation which accesses the old location of the physical flash page will read the one or more codewords of the physical flash page. As the errors still persist and the codeword size typically is larger than the CLR-DPL unit obtained from the corrective DPL, some portions of the new physical page to be written may not be available due to ECC not able to recover them. Hence, the 528 byte CLR-DPL unit write would never take place because the flash card is designed to operate at a data unit size of 4 KiB (for example, writing the entire 4 KiB). For this reason, the VRAID rewrite operation will not be successful and CLR fails. Some embodiments of the present invention solve issues caused by this complicating factor where page/sector sizes between DPLs do not match. For example, the mismatch may cause problems because codeword size is larger than the 528 B that is received from the higher layer. For this reason, any codeword that is uncorrectable for that physical page for which re-write data is not obtained from above will result in missing data for that page. As the controller has to write 4 KiB (i.e., the granularity at which the LPT maintains logical to physical mappings), it cannot determine what to fill into these missing locations.

In some embodiments, DPLs are organized hierarchically. In some of these hierarchical DPL embodiments, when one DPL fails to deliver the data (due to an encountered error), then the next higher level DPL, as defined by the hierarchical structure of the hierarchy, will try to recover the data next. But depending on the architecture of the storage system and algorithms used in DPLs, in other embodiments of the present invention, a strict hierarchical organization may not be required. To simplify the description: (i) the layer that encountered the uncorrectable (read) error will herein be referred to as the "lower DPL" (or, the "initial DPL"), and (ii) the layer that corrects the uncorrectable error encountered in the lower DPL as the "upper DPL" (or "first corrective DPL" or, more simply, the "corrective DPL"). Note that in some embodiments: (i) the initial DPL may determine to postpone error correction; (ii) the initial DPL immediately returns an error (without attempting data recovery); and (iii) responsive to return of the error by the initial DPL, the corrective DPL will perform the error recovery.

Some embodiments of the present invention may include one, or more, of the following features, operations, characteristics and/or advantages: (i) a read of any number of sectors representing members of an in-progress CLR 4K LBA request need to result in an error indication if there is either no data or incorrect data; (ii) sub-4K writes of any number sectors representing members of a CLR 4K LBA request will succeed without error by: (a) performing a specific data replacement strategy during the RMW operation in the lower DPL, and (b) detecting by the lower DPL if a data replacement strategy had been applied to any sector in read requests; (iii) if a data replacement strategy has been applied, a read error is returned for the read operation; and/or (iv) the return of a read error for the read operation ensures that: (a) the RMW-R in the lower DPL does not fail, (b) the upper DPL can complete the CLR procedure, and (c) at any point in time, a read to a location that is uncorrectable will indeed return an uncorrectable read error event.

In some embodiments, the corrective DPL performs the following steps: (i) detect an uncorrectable read error from the initial DPL; and (ii) for an uncorrectable sector, the CLR of the corrective DPL performs the following operations (not necessarily in the following order): (a) reread the given sector to make sure the error still exists, (b) inform lower DPL about the reassignment of the sector, (c) rebuild the data sector from parity information (or other types of redundant data), (d) rewrite the data sector to the original LBA, (e) if new error is encountered, go to step (i), and (f) return reconstructed data to requestor. It is noted that the foregoing operations and sub-operations do not need to necessarily need to be performed serially and/or in order. For example, the corrective DPL can return the data as soon as it is reconstructed without having to check if the initial DPL still encounters errors.

In particular, if only partial data was requested from the affected 4 KiB page, there is no need to wait until all other sectors of the page are corrected.

In some embodiments, the initial DPL performs the following steps: (i) any incoming read requests that turns out to be uncorrectable by the initial DPL will be returned as a read error; (ii) the initial DPL may further search for other logical pages affected in the same physical page and report them to the corrective DPL, (iii) for each uncorrectable sector, the upper DPL is sending a rewrite operation to the lower DPL which performs RMW by: (a) reading the old data, (b) performing a data replacement strategy for any uncorrectable sector in the old data that is not being rewritten, (c) generating a new logical data page from the rewrite data sectors, the successfully read sectors and the result of the data replacement strategy, (d) writing the data page to a new location (that is, into a new physical page), and (e) updating the LPT (Logical-to-physical translation table) to reflect the new location of the logical page; (iv) upon read operations, detecting if a data replacement strategy had been applied to any sector in the read request; and (v) if a data replacement strategy has been applied to any sector within the scope of the read request, returning a read error.

In some embodiments, the data replacement strategy is in the form of a simple marker, and implemented by the following operations: (i) associating a small bit array to each logical page where each bit in the array indicates if the corresponding sector in the logical page is marked as being uncorrectable; (ii) upon RMW-R operations, uncorrectable sectors are simply replaced with any data pattern which will then be written in the write phase of the RMW operation; (iii) upon host reads, it is first checked if any sector being read has the uncorrectable bit set in the bit array; and (iv) on condition that it is determined that any sector being read has the uncorrectable bit set in the bit array, a read error is returned. In some embodiments, the bit array is stored in the LPT table because the LPT entry has to be accessed on every LBA read, but it is noted that additional DRAM (dynamic random access memory) space is required to hold this information. Alternatively, the bit array may be stored as meta-data in the physical data page where the logical page is stored or in a dedicated physical page.

In some embodiments, the data replacement strategy includes creation of an E-page. In some of these E-page embodiments, the following three steps are performed: (i) the RMW module is modified such that RMW-R failures result in background sector data being fabricated and filled in with "E-Page content" (for example, all ones, 528 B) for the subsequent RMW-W—the E-Page content for remaining sectors serves as a per-sector indicator of bad data that can be carried within a 4K container with a valid LPT entry; (ii) the T10 CRC error checks in the lower DPL will be modified to allow E-Page as valid content and CRC; and (iii) the host read status hardware in the lower DPL detects E-Page sector content and asserts the E-Page error flag in the 32b host status field if any sector/s of a host read have E-Page content (that is, Check Condition with Sense data of K/C/Q=03/11/00 with the sense LBA equal to the 1st LBA with the E-page pattern). During the CLR process, this indicator informs the re-build process of bad data and need for re-write as well as an indicator for possible host reads.

Given all Flashcard CLR requests are 4K, it is expected that there will be 8 Sub-4K single sector writes from the system. The first Sub-4K write will result in a RMW-R failure triggering fabricated data for the background sectors and the new data for the foreground sector that succeeds and is given a new flash PHY (physical layer) address. Subsequent Sub-4K writes to fix the rest of the sectors will not result in an RMW-R failure because the data has been moved to a new working location. But, reads by the system will result in a data-check due to E-page content and therefore ensure they are re-written. The process continues until all 8 of the sectors have been written completing the LBA.

In some embodiments, a corrupt LBA recovery scheme: (i) uses multiple data protection layers with different sector/page sizes where uncorrectable errors are replaced with a marker, upon reads, detecting if a page has been marked as being uncorrectable; (ii) when a marker has been detected and the read operation being a host read, returning a read error; and (iii) when a marker has been detected and the read operation is an internal read, the read request is not considered as failed and the error marker is maintained.

A method used in some embodiments includes the following operations: (i) performing a specific data replacement strategy during the RMW operation in the lower DPL; (ii) detecting by the lower DPL if a data replacement strategy had been applied to any sector in read requests; and (iii) if a data replacement strategy had been applied to any sector in read requests, a read error is returned for the read operation.

A method used in some embodiments includes the following operations: (i) uncorrectable errors are replaced with a marker, upon reads, detecting if a page has been marked as being uncorrectable; (ii) when a marker has been detected and the read operation being a host read, returning a read error; and (iii) when a marker has been detected and the read operation being an internal read, not failing the read request and maintaining the error marker.

As shown in FIGS. 5 to 8, multiple DPL data storage system 500 includes: RAID controller 502 (including RAID level DPL machine logic, not separately shown); and flash card 504 (including flash card level DPL machine logic, not separately shown). RAID controller 502 includes: first RAID controller storage portion 510; second RAID controller storage portion 512; and additional RAID controller storage 514. It is noted that portion 510 is shown separately only to indicate what is being sent to the lower DPL to be written and should not be taken to imply a physically separate structure. Flash card 504 includes: controller 520 (including E-page detector 521); LPT 522; page read write staging memory 524; first page set (also sometimes herein referred to as first block) 526; second page set (also sometimes herein referred to as second block) 527; and third page set (also sometimes herein referred to as third block) 529. As will be discussed in the following paragraph(s), an embodiment of a corrupt LBA recovery scheme will be applied in the context of multiple DPL data storage system 500.

Figure 5:
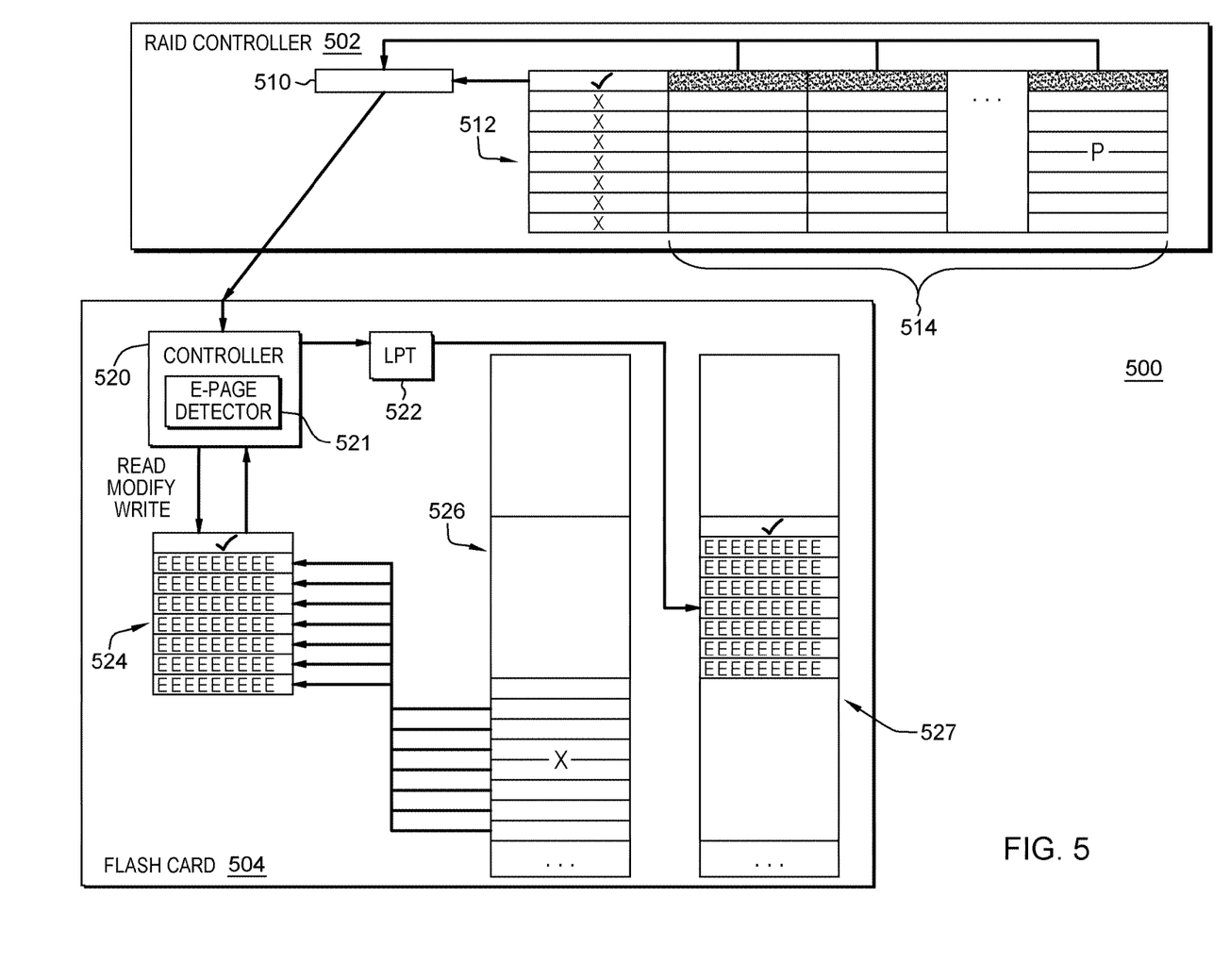
FIG. 5 is a block diagram view of a first embodiment of a system—this first embodiment system is an embodiment of the present invention.

As shown in FIG. 5, the corrupt data recovery scheme of system 500 uses a data replacement strategy where the DPL of RAID controller 502 corrects a corrupted unit of data first RAID controller storage portion 510. This corrected unit of data has a CLR-DPL unit size of 528 bytes because RAID DPL uses a CLR-DPL data unit size of 528 bytes (or, more specifically, a sector size of 528 bytes). The parity is stored in the sectors marked with "P" in the remaining sectors 514 of the stripe (the set of sectors on the right in the RAID controller in FIGS. 5 and 6).

As shown in FIG. 5, this corrected unit has been: (i) sent to controller 520 of flash card 504; (ii) combined, by controller 520, with seven other 528 byte data units to form a 4K E-page (with the corrected 528 bytes of data being indicated by a check mark and the other seven 528 byte units being indicated by capital "E" notations); and (iii) stored in a previously erased and not yet written location, here in second page set 527 of flash card 504 (see second page of second page set 527). Note that it is theoretically possible to write the new page into a previously erased and not yet written location in the same page set, but separate page sets are shown here for facility of inspection. This corrected E-page is structured, by controller 520, to have a 4K data unit size because the CLR-DPL data unit size of the flash card is 4K (as discussed above). Alternatively, in other embodiments of the present invention, the corrective DPL (in the embodiment under discussion, the DPL of RAID controller 502) and the initial DPL (in the embodiment under discussion, the DPL of flash card 504) may have other CLR-DPL data unit sizes. The seven 528 byte data units added, by controller 520, to form the E-page including the corrected data are written with any detectable pattern. One may argue that all "one's" will stress the flash less, however, today flash controllers use a data scrambler to balance the number of ones and zeros, so it may not be helpful in all embodiments. Alternatively, other data patterns could be written to the portion of the E-Page that does not contain corrected data. This data protection strategy may be more succinctly described as insertion of an E-Page on an internal read error.

Figure 6:
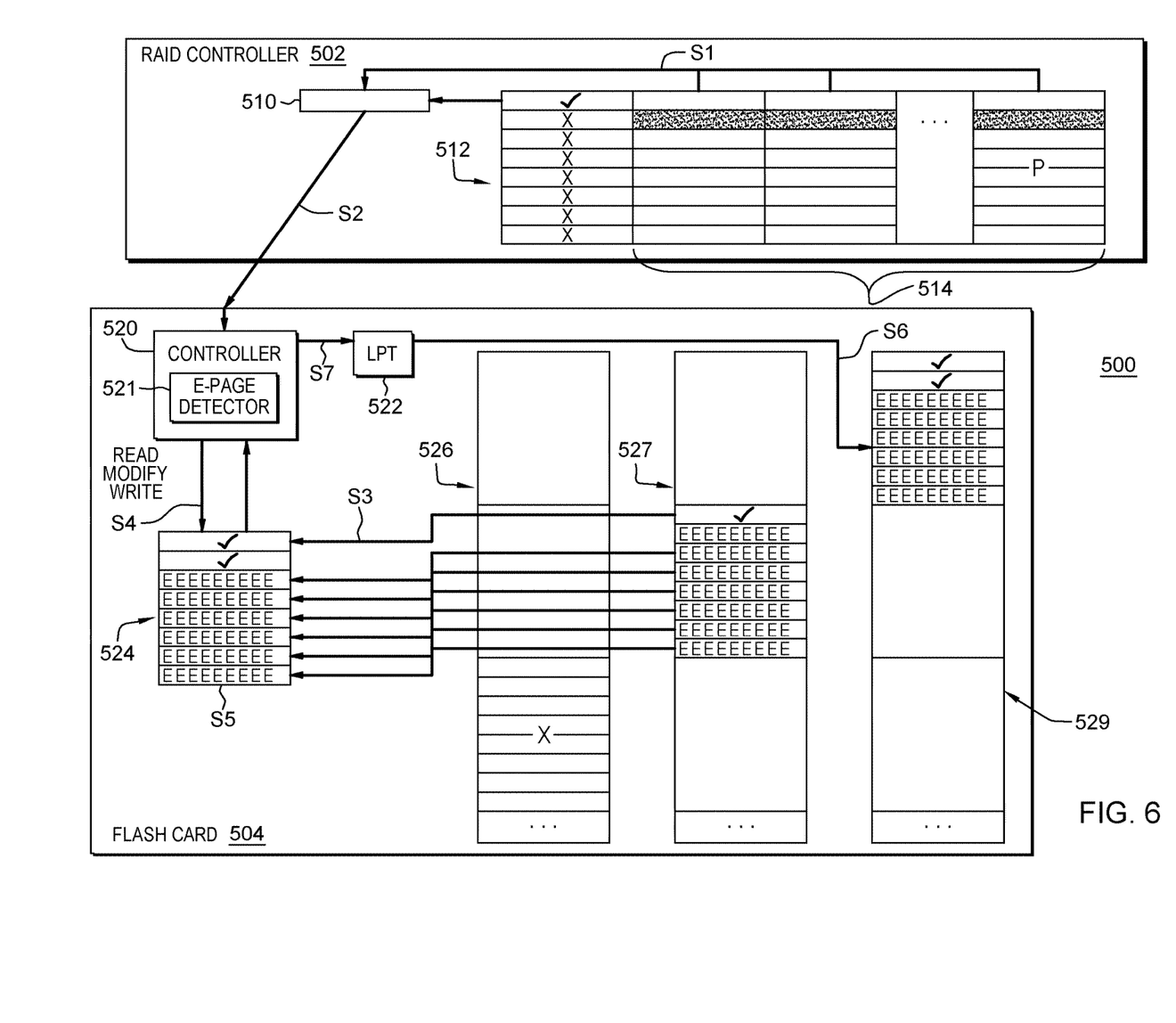
FIG. 6 is another block diagram view of the first embodiment system.

FIG. 6 shows how further E-pages may be inserted iteratively to correct additional 528 byte portions of the corrected E-page (see E-page with two corrected 528 byte portions stored as first page of third page set 529). In some embodiments, the RAID DPL may be able to correct all 528 byte portions of the E-page (not shown in the Figures). In other embodiments, only some 528 byte portions of the E-page may be susceptible to correction by the corrective DPL (in this example, the DPL of RAID controller 502). The corrected E-Page may be more generically referred to as the "corrected CLR-DPL data unit of the storage device," or, the "corrected CLR-DPL data unit of the initial DPL device."

As at least partially shown in FIG. 6, the upper DPL will perform the following operations (not necessarily in the following order): (i) detect an uncorrectable read error from the lower DPL (not shown in FIG. 6); (ii) for an uncorrectable sector: (a) reread the given sector to make sure the error still exists (preferably, not shown in FIG. 6), (b) inform lower DPL about the reassignment of the sector (see FIG. 6 at arrow labelled S2), and (c) rebuild the data sector from parity information (see FIG. 6 at S1); (iii) rewrite the data sector to the original LBA (see FIG. 6 at S2); (iv) if new error is encountered, then go to the first step; and (v) if no new error is encountered, then return reconstructed data to requestor.

As at least partially shown in FIG. 6, the lower DPL will perform the following operations for each uncorrectable sector the upper DPL that is sending a rewrite operation and upon receiving the write request from the upper DPL perform RMW by: (i) reading the old data from the page in page set 527 (see FIG. 6 at S3); (ii) performing a data replacement strategy for any uncorrectable sector in the old data that is not being rewritten (see FIG. 6 at S4); (iii) generating a new logical data page from the rewrite data sectors, the successfully read sectors, and the result of the data replacement strategy (see FIG. 6 at S5); (iv) writing the data page to a new location (that is, into a new physical page, see, FIG. 6 at S6); and (v) updating the LPT to reflect the new location of the logical page (see FIG. 6 at S7). The update invalidates data stored in the old page in page set 527. This invalidation may preferably happen implicitly.

Figure 7:
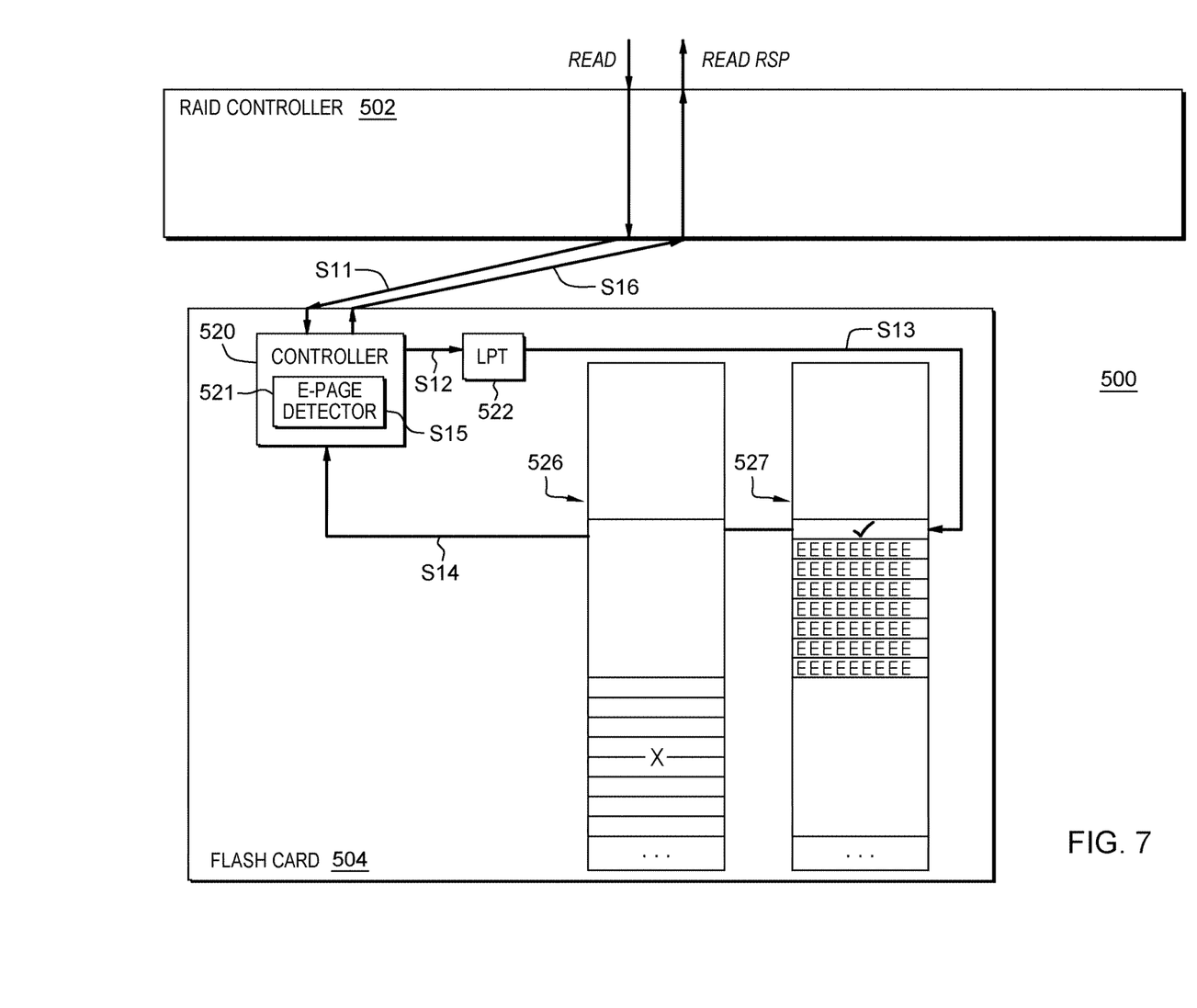
FIG. 7 is another block diagram view of the first embodiment system.

As shown in FIG. 7, a read request is received by the lower DPL for data in the 528 byte portion of the corrected CLR-DPL data unit (that is, the flash card E-page) that has been corrected (that is, the part marked by a checkmark, see FIG. 7 at S11). Controller 520 determines the location of the data by a lookup in the LPT 522 (see FIG. 7 at S12). Controller 520 issues a read request of the corresponding page in page set 528 (see FIG. 7 at S13) to read the requested data (see FIG. 7 at S14). E-page detector 521 detects if a data replacement strategy had been applied for the sector requested (see FIG. 7 at S15). E-page detector 521 may get the information directly from the LPT lookup (that is, in this case the operations of issuing a read request S13 and reading the requested data S14 would not be needed) or from the data page read S14. Because this portion of the corrected CLR-DPL data unit has been previously corrected by the higher level DPL of RAID controller 502, the requested data is returned by controller 520 of flash card 504 through RAID controller 502 in Step 16.

Figure 8:
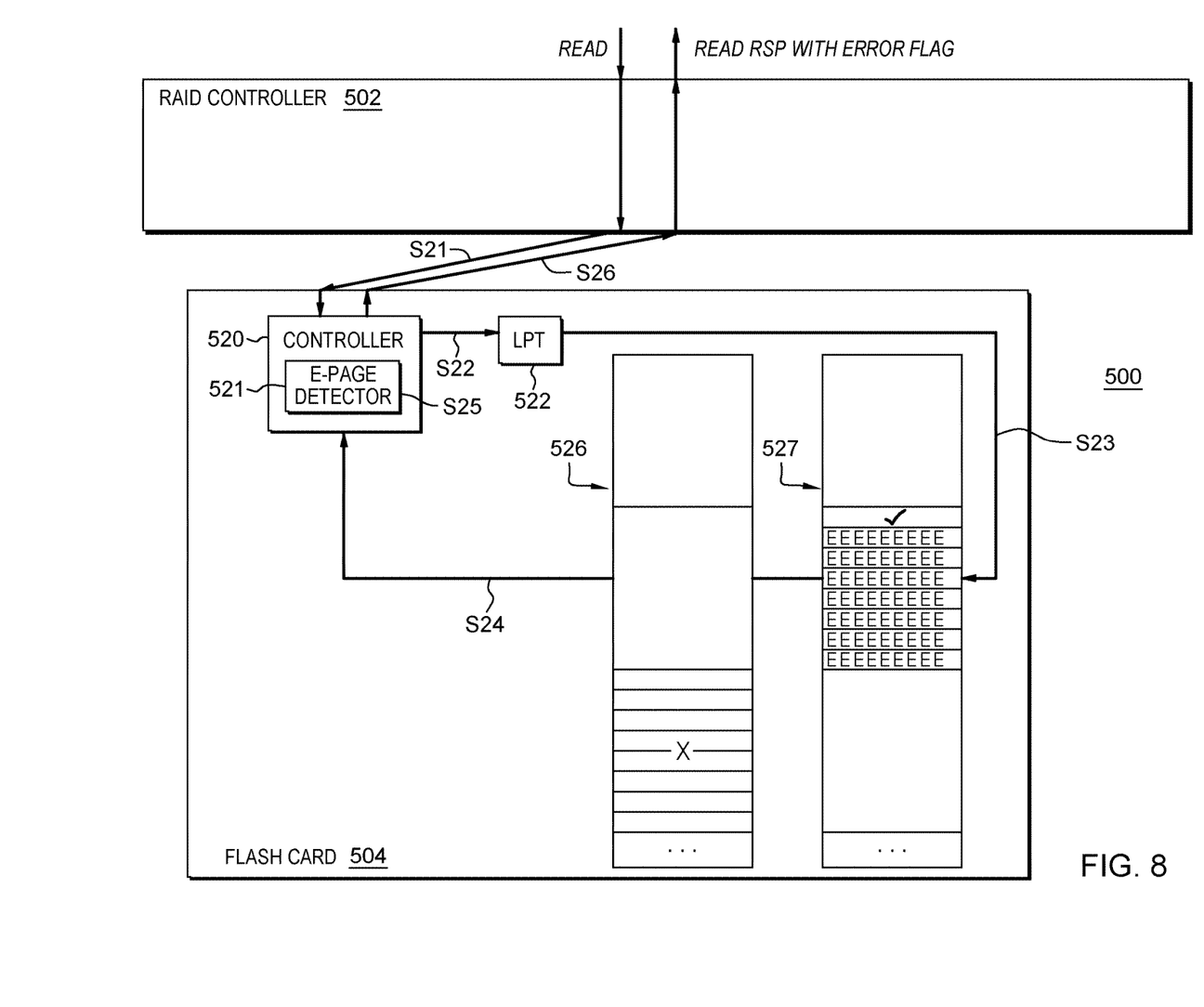
FIG. 8 is another block diagram view of the first embodiment system.

As shown in FIG. 8, a read request is received by the lower DPL for data within in the seven 528 byte portions of the corrected CLR-DPL data unit (that is, the flash card E-page) that has not been corrected (that is, the part marked by capital "E"'s) as shown in FIG. 8 at 521. Controller 520 determines the location of the data by a lookup in the LPT 522 (see FIG. 8 at S22). Controller issues a read request of the corresponding page in page set 527 (see FIG. 8 at S23) to read the requested data (see FIG. 8 at S24). E-page detector 521 detects if a data replacement strategy had been applied for the sector requested (see FIG. 8 at S25). Similarly, as above, the E-page detector may get the information directly from the LPT lookup S22 (that is, in this case operations corresponding to S23 and S24 would not be needed) or from the data page read in operation S24. Because this portion of the corrected CLR-DPL data unit has not been corrected by the higher level DPL of RAID controller 502, a read response with an error flag is returned by E-Page detector 521 of controller 520 of flash card 504 to the RAID controller 502. (see FIG. 8 at S26).

III. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for use with a flash array data storage device having data stored therein to include a RAID (redundant array of independent devices) corrective protection layer, the method comprising:
    detecting, by a flash card level data protection layer, corruption within a first DPL-CLR (data protection layer corrupt logical block addressing recovery) data unit, with the first DPL-CLR data unit being characterized by a first data unit size that is a page size of the flash array data storage device;
    correcting, by the RAID corrective data protection layer, a portion of data of the first DPL-CLR data unit to obtain a corrected second DPL-CLR data unit within the first DPL-CLR data unit, with the second DPL-CLR data unit being characterized by a second data unit size which is a sector size of the RAID corrective protection layer, with the second data unit size being smaller than the first data unit size; and
    applying a data replacement strategy to portions of the first DPL-CPR data unit other than a portion of the first DPL-CLR data unit corrected by the second DPL-CLR data unit, with the application of the data replacement strategy including writing an error code to portions of the first DPL-CPR data unit other than a portion of the first DPL-CLR data unit corrected by the second DPL-CLR data unit.

2. The method of claim 1 wherein the data replacement strategy further includes creation and use of a simple marker.

3. The method of claim 1 wherein the writing an error code to portions of the first DPL-CPR data unit other than a portion of the first DPL-CLR data unit corrected by the second DPL-CLR data unit creates an E-page.

4. The method of claim 1 further comprising:
    assembling a third DPL-CLR data unit based upon the second DPL-CLR data unit, with the third DPL-CLR data unit: (i) having a data unit size equal to the first data unit size, (ii) including corrected data of the second DPL-CLR data unit, and (iii) further including other data to fill out the disparity between the first data unit size characterizing the third DPL-CLR data unit and the second data unit size characterizing the second DPL-CLR data unit; and
    storing the third DPL-CLR data unit in a physical data storage device associated with the initial data protection layer.

5. The method of claim 1 further comprising:
    upon a read operation that requests requested data, determining, by a controller, that a data replacement strategy has been applied for the requested data; and
    responsive to the determination that a data replacement strategy has been applied, returning an error indicator/message as a response to the request of the read operation.

6. The method of claim 1 further comprising:
    upon a read operation that requests requested data, determining, by a controller, that a data replacement strategy has not been applied for the requested data; and
    responsive to the determination that a data replacement strategy has not been applied, returning the requested data.

7. The method of claim 1 wherein the data replacement strategy further includes:
    repetitively re-writing corrected data over the error codes written at portions of the first DPL-CPR data unit other than a portion of the first DPL-CLR data unit corrected by the second DPL-CLR data unit, until an entire page corresponding to the first DPL-CLR is recovered.

8. A computer program product (CPP) for use with a flash array data storage device having data stored therein to include a RAID (redundant array of independent devices) corrective protection layer, the CPP comprising:
    a set of storage device(s); and
    computer code stored collectively in the set of storage device(s), with the computer code including data and instructions to cause a processor(s) set to perform at least the following operations:
        detecting, by a flash card level data protection layer, corruption within a first DPL-CLR (data protection layer corrupt logical block addressing recovery) data unit, with the first DPL-CLR data unit being characterized by a first data unit size that is a page size of the flash array data storage device,
        correcting, by the RAID corrective data protection layer, a portion of data of the first DPL-CLR data unit to obtain a corrected second DPL-CLR data unit within the first DPL-CLR data unit, with the second DPL-CLR data unit being characterized by a second data unit size which is a sector size of the RAID corrective protection layer, with the second data unit size being smaller than the first data unit size, and
        applying a data replacement strategy to portions of the first DPL-CPR data unit other than a portion of the first DPL-CLR data unit corrected by the second DPL-CLR data unit, with the application of the data replacement strategy including writing an error code to portions of the first DPL-CPR data unit other than a portion of the first DPL-CLR data unit corrected by the second DPL-CLR data unit.

9. The CPP of claim 8 wherein the writing an error code to portions of the first DPL-CPR data unit other than a portion of the first DPL-CLR data unit corrected by the second DPL-CLR data unit creates an E-page.

10. The CPP of claim 8 wherein the computer code further includes data and instructions to cause the processor(s) set to perform at least the following further operations:

assembling a third DPL-CLR data unit based upon the second DPL-CLR data unit, with the third DPL-CLR data unit: (i) having a data unit size equal to the first data unit size, (ii) including corrected data of the second DPL-CLR data unit, and (iii) further including other data to fill out the disparity between the first data unit size characterizing the third DPL-CLR data unit and the second data unit size characterizing the second DPL-CLR data unit; and storing the third DPL-CLR data unit in a physical data storage device associated with the initial data protection layer.

11. The CPP of claim 8 wherein the computer code further includes data and instructions to cause the processor(s) set to perform at least the following further operations:

upon a read operation that requests requested data, determining, by a controller, that a data replacement strategy has been applied for the requested data; and responsive to the determination that a data replacement strategy has been applied, returning an error indicator/message as a response to the request of the read operation.

12. The CPP of claim 8 wherein the computer code further includes data and instructions to cause the processor(s) set to perform at least the following further operations:

upon a read operation that requests requested data, determining, by a controller, that a data replacement strategy has not been applied for the requested data; and responsive to the determination that a data replacement strategy has not been applied, returning the requested data.

13. The CPP of claim 8 wherein the data replacement strategy further includes:

repetitively re-writing corrected data over the error codes written at portions of the first DPL-CPR data unit other than a portion of the first DPL-CLR data unit corrected by the second DPL-CLR data unit, until an entire page corresponding to the first DPL-CLR is recovered.

14. A computer system (CS) for use with a flash array data storage device having data stored therein to include a RAID (redundant array of independent devices) corrective protection layer, the CS comprising:

a processor(s) set;

a set of storage device(s); and computer code stored collectively in the set of storage device(s), with the computer code including data and instructions to cause the processor(s) set to perform at least the following operations:

detecting, by a flash card level data protection layer, corruption within a first DPL-CLR (data protection layer corrupt logical block addressing recovery) data unit, with the first DPL-CLR data unit being characterized by a first data unit size that is a page size of the flash array data storage device, correcting, by the RAID corrective data protection layer, a portion of data of the first DPL-CLR data unit to obtain a corrected second DPL-CLR data unit within the first DPL-CLR data unit, with the second DPL-CLR data unit being characterized by a second data unit size which is a sector size of the RAID corrective protection layer, with the second data unit size being smaller than the first data unit size, and applying a data replacement strategy to portions of the first DPL-CPR data unit other than a portion of the first DPL-CLR data unit corrected by the second DPL-CLR data unit, with the application of the data replacement strategy including writing an error code to portions of the first DPL-CPR data unit other than a portion of the first DPL-CLR data unit corrected by the second DPL-CLR data unit.

15. The CS of claim 14 wherein the writing an error code to portions of the first DPL-CPR data unit other than a portion of the first DPL-CLR data unit corrected by the second DPL-CLR data unit creates an E-page.

16. The CS of claim 14 wherein the computer code further includes data and instructions to cause the processor(s) set to perform at least the following further operations:

assembling a third DPL-CLR data unit based upon the second DPL-CLR data unit, with the third DPL-CLR data unit: (i) having a data unit size equal to the first data unit size, (ii) including corrected data of the second DPL-CLR data unit, and (iii) further including other data to fill out the disparity between the first data unit size characterizing the third DPL-CLR data unit and the second data unit size characterizing the second DPL-CLR data unit; and storing the third DPL-CLR data unit in a physical data storage device associated with the initial data protection layer.

17. The CS of claim 14 wherein the computer code further includes data and instructions to cause the processor(s) set to perform at least the following further operations:

upon a read operation that requests requested data, determining, by a controller, that a data replacement strategy has been applied for the requested data; and responsive to the determination that a data replacement strategy has been applied, returning an error indicator/message as a response to the request of the read operation.

18. The CS of claim 14 wherein the computer code further includes data and instructions to cause the processor(s) set to perform at least the following further operations:

upon a read operation that requests requested data, determining, by a controller, that a data replacement strategy has not been applied for the requested data; and responsive to the determination that a data replacement strategy has not been applied, returning the requested data.

19. The CS of claim 14 wherein the data replacement strategy further includes:

repetitively re-writing corrected data over the error codes written at portions of the first DPL-CPR data unit other than a portion of the first DPL-CLR data unit corrected by the second DPL-CLR data unit, until an entire page corresponding to the first DPL-CLR is recovered.

* * * * *